Figure 1:
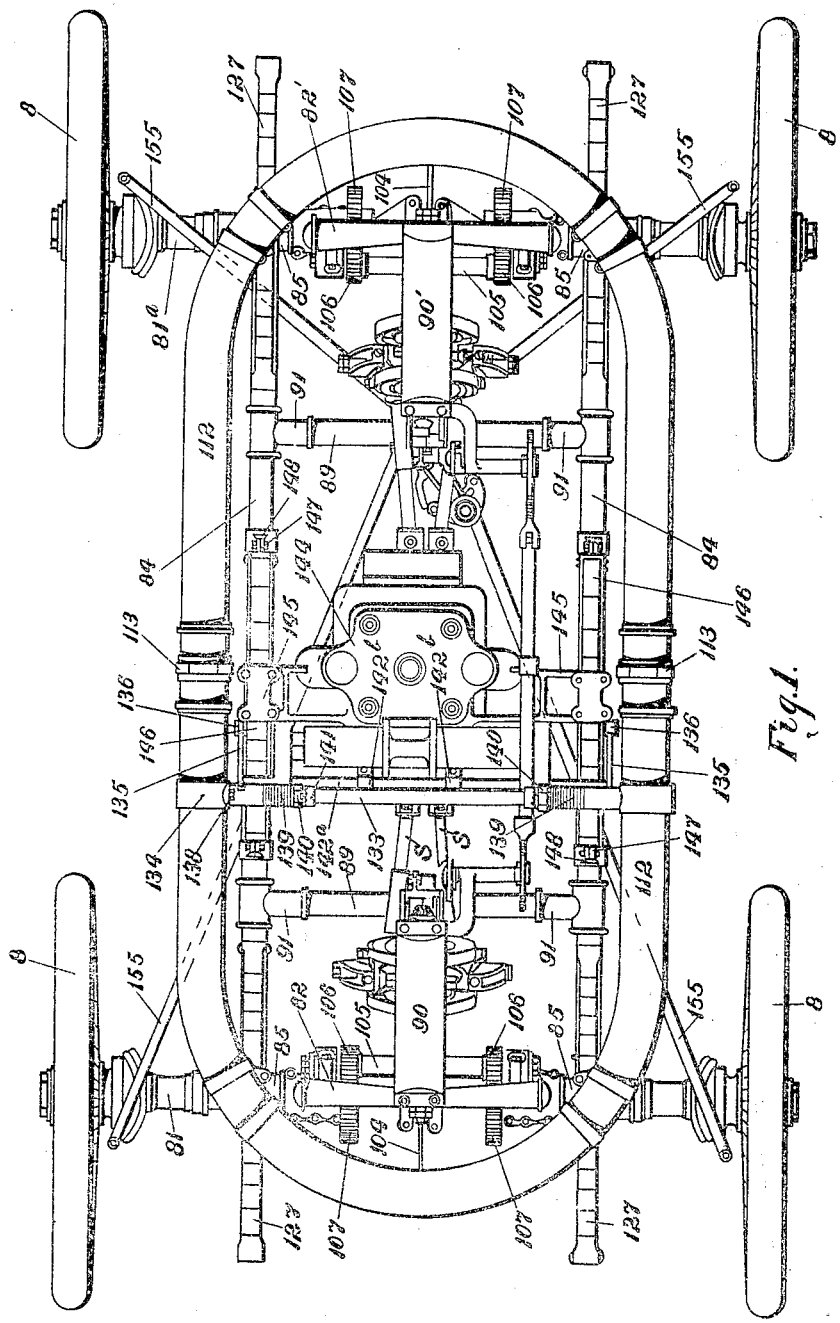

E. P. COWLES.
MOTOR VEHICLE.
APPLICATION FILED APR. 6, 1914.

1,112,678.

Patented Oct. 6, 1914.
2 SHEETS—SHEET 1.

Witnesses
G. F. Baker.
B. M. Kent.

Inventor
Edward P. Cowles
by Foster Freeman Watson & Cort
Attorneys

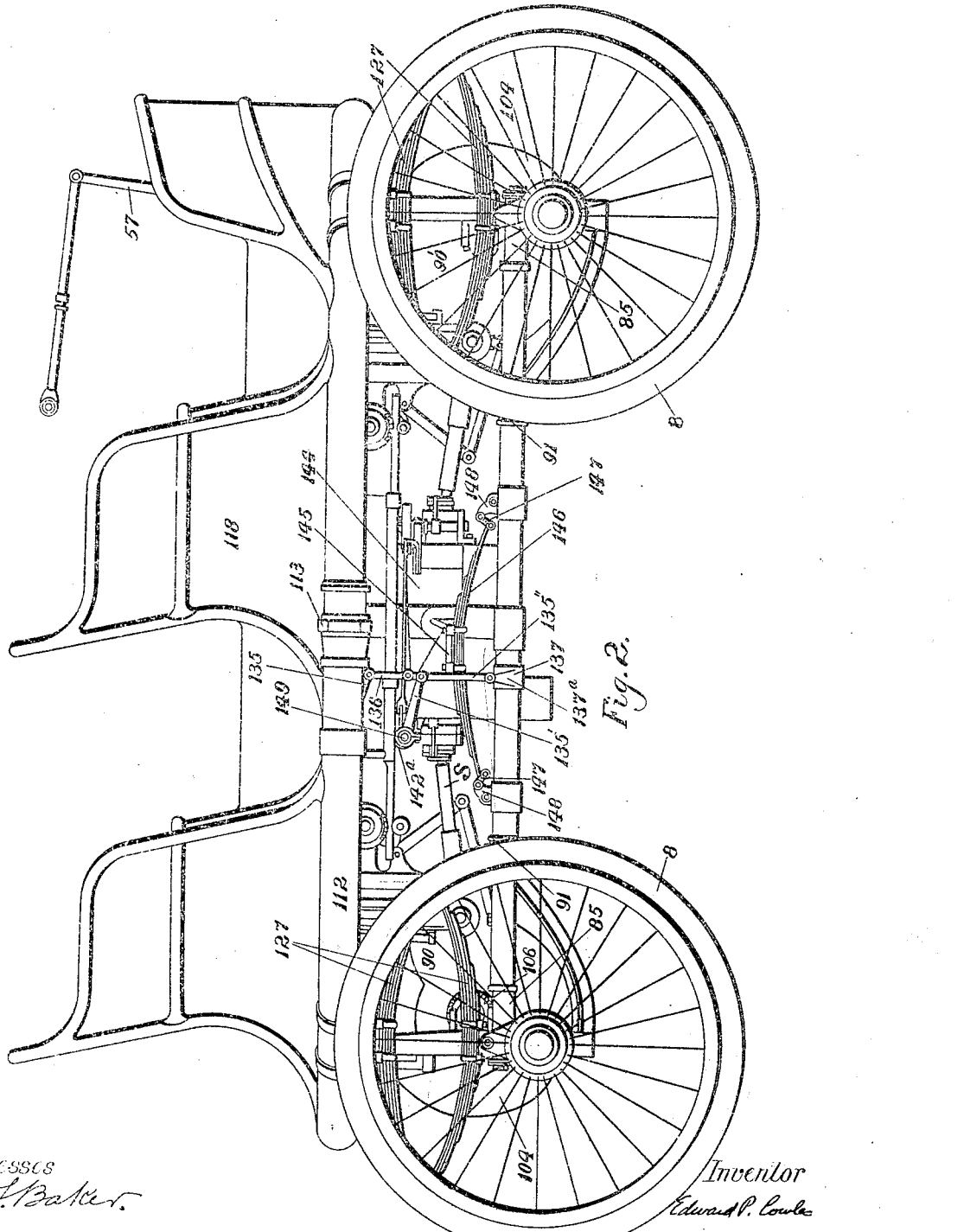

UNITED STATES PATENT OFFICE.

EDWARD P. COWLES, OF SPARTA, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

MOTOR-VEHICLE.

1,112,878.  Specification of Letters Patent.  Patented Oct. 6, 1914.

Original application filed September 6, 1901, Serial No. 74,697. Divided and this application filed April 6, 1914. Serial No. 829,895.

*To all whom it may concern:*

Be it known that I, EDWARD P. COWLES, a citizen of the United States, and resident of Sparta, county of Kent, State of Michigan, have invented certain new and useful Improvements in Motor-Vehicles, of which the following is a specification.

This application is a division of my application Serial No. 714,097, filed August 8, 1912, which in turn is a division of my earlier application, filed September 6th, 1901, and issued January 21, 1913, Patent No. 1,050,810.

My present invention relates to motor vehicles and particularly to the frame, running gear and motor.

One of the objects of the invention is to provide improved means for mounting the motor to meet the varied conditions of road work.

With this and other objects in view, the invention consists in the construction and arrangement of parts described in the following specification, reference being had to the accompanying drawings, in which:—

Figure 1 is a plan view of a vehicle embodying my invention; and Fig. 2 is a side elevation.

In the embodiment of the invention illustrated herein the motor is shown as connected to drive both the front and rear wheels, all of which are also arranged for steering, but it will be understood that my invention is not limited to the construction shown but is capable of being otherwise embodied without departing from its scope.

Referring to the drawings, 8 are the four driving wheels mounted at the ends of the tubular axles 81 and 81ª. These wheels are shown as adapted for simultaneous steering through rods 155 and suitable connections to the steering shaft 57 mounted on the body. In the yoke part 82 of axle 81 and 82' of axle 81ª there is mounted a driving gear 90, 90' similar to that shown in my Patent No. 654,716, dated July 31, 1900. These driving gears are essentially the same in both axles and each consists of a driving disk 104 mounted at the middle of a countershaft 105 supported in bearings on the axle yoke 82, said countershaft having pinions 106 which intermesh with spur wheels 107, secured to the inner ends of driving shafts within the tubular axle. The driving gear also includes suitable speed changing gearing and is driven from the motor as will be hereinafter described.

A frame comprising side bars 84 and cross bars 89 is shown as connecting the front and rear axles and forming reach bars. This frame also supports the motor, and the cross bars 89 prevent the yoke members 82, 82' from turning under the reaction of the driving gear 90, 90'. The connections between the bars 84 and the axles are made by long bearing T-shaped couplings 85 in which the reach bars and axles are free to turn, and the cross bars 89 are connected to the reach bars 84 by similar freely turning, long-bearing T-shaped couplings 91. A second and main frame 112, which may be termed the body frame, is mounted above the frame members 84, and is supported from the axles upon springs 127. This body frame 112 is preferably formed of two U-shaped pieces of tubing with their straight ends joined together as at 113. A suitable body 118 may be mounted on the frame 112 and the steering shaft 57 and the motor control devices may be suitably arranged thereon.

Preferably the springs 127 are of the plain elliptical type, there being two on each axle, of about the same tension, and placed the same distance apart, so that the sway of the body caused by the vertical play of either axle as a wheel runs over an obstruction or drops into a rut, will be half as much as that axle, or a mean between the relative twist of the two axles.

For the purpose of making the body more stable relative to the running gear a yielding connection is used comprising a rock shaft 133 across the body frame with bearings 134 secured by clips to said frame. From each end of this shaft extend short horizontal arms 135 and pivotally connected to the outer ends of these arms are two links 136, which extend down and are pivoted to each of the bars 84 of the lower frame by clips 137. It is obvious that while the body is perfectly free to play up and down its plane is held rigidly parallel with a line passing through the two pivots 137ª on the bars 84, and as the pivots 137ª are placed as near midway between the two axles as possible, it is obvious that the plane of the body frame will always take the mean between the two horizontal planes passing through the front and rear axle at whatever angle they may make with respect to each other, or when any wheel runs over an obstruction or drops into a depression, the body will tilt one-half as much as the axle supported by that wheel.

When the vehicle is moving at a very high speed imperfections in the road bed would produce concussions that if the arms 135 were rigidly fastened to shaft 133 would endanger breaking or bending of parts, or give unpleasant jolts to occupants. To remedy this I mount the arms 135 loosely on shaft 133 and provide stops 138 that prevent said arms from turning down but allow them to turn up to a limited extent. Coiled springs 139 fitted around the shaft each having one end attached to a hub of an arm 135 and the other end to a collar 140 force the arms 135 down against stops 138. For all ordinary conditions the rocker arms 135 act the same as though attached rigidly to the shaft 133, but with an unusual jolt they yield and relieve parts of undue strain. The collar 140 is loose on shaft 133 and has ratchet teeth cut in the face opposite spring 139, which engage with corresponding teeth cut in the face of a collar 141 which is firmly fixed on shaft 133. By turning collar 140 any degree of tension desired can be given to the springs 139.

The motor 144 is mounted upon a motor supporting frame which in the present instance is the lower frame comprising the side bars 84. Extending laterally and horizontally from the sides of the motor 144, and preferably near its center of gravity, are brackets 145, the outer ends of which are supported upon the side bars 84. A flexible support for these brackets is shown comprising half elliptical springs 146 to which the brackets 145 are firmly bolted, and the ends of the springs are connected by links 147 to short posts 148 secured by clips to the side bars 84. The elasticity of the springs accommodates the vertical twisting of the bars 84, causing the motor to ride very smoothly. One end of the motor 144 has a further support from the frame members 84 through its connection, as by brackets 142$^b$, with the middle part of a cross member 142$^a$ which is so connected at its ends with the side bars 84 that the vertical movements of one side bar are transmitted through said cross member 142$^a$ to the other side bar. This latter connection, in the embodiment shown, comprises a rock shaft 149 extending through the cross member 142$^a$ and having arms 135' rigidly attached to its ends, said arms being connected to the frame bars 84 by links 135". With the spring mounting of the central part of the motor on the supporting frame, the rock shaft 149 and its connections act to transmit the torque reaction of the motor to the frame and axles.

The motor is connected to the driving gear by means of the flexible and extensible shafts $s$, these shafts being similar to the shafts 53 of my Patent No. 654,716. Therefore the motor shaft can be deflected considerably from its normal position without interfering with the transmission of power from the motor to the driving gear, or impairing the efficient working, and consequently the motor is free to play up and down with the springs or oscillate in any direction, the elasticity of the spring allowing it, to a limited extent, to rock laterally or horizontally and the links 147 allowing it to vibrate longitudinally and in the case of a chain drive, accommodate a distance piece to regulate tension of chain and twist horizontally. This manner of mounting a self-contained motor flexibly has one other important advantage. The heavy balance wheel necessary on all explosive motors revolving at a high rate of speed—from 600 to 1000 revolutions per minute—acts as a powerful gyroscope that resists with great force any sudden change in its plane of revolution, and the motor of the vehicle over an uneven road bed has a tendency to constantly change the plane of revolution of this wheel resulting in subjecting the motor and vehicle frame to great strains. This strain is most direct and severe on the motor shaft and bearings, and has a very destructive effect. With a self-contained motor mounted flexibly, as hereinbefore described, the gyrostatic action of the balance wheel is accommodated. For instance, if either set of wheels were to drop into a depression or run over an obstruction changing the plane of the running gear, the gyrostatic principle would cause the balance wheel to oscillate with respect to the running gear and as the flexible mounting hereinbefore described accommodates this oscillation, all of the parts are relieved from strain. Practically the balance wheel controls and steadies the motor and gives it stability.

The motor frame can be extended to carry the accessories, such as oil tank, water tank, steam generator, storage battery, etc., according to the kind of motor employed. Preferably I would place these accessories in the body frame and connect them to the motor by flexible conduits. That for water, steam, compressed air, etc., could be common hose. That for oil could be jointed pipe of a form well known to persons skilled in the art.

Having thus described my invention, what I claim and desire to secure by Letters Patent is:—

1. In a motor vehicle, the combination of a driving axle, a motor supporting frame, a motor flexibly mounted on the frame, a flexible longitudinally extending driving shaft connecting the motor to the driving axle, and means connected with the motor and said frame for preventing the motor turning, relatively to the frame, about an axis extending longitudinally of the vehicle.

2. In a motor vehicle, the combination of a driving axle, a motor supporting frame, a motor supported on springs on said frame, a flexible longitudinally extending driving shaft connecting the motor to the driving axle, and a member extending transversely of the motor and connected thereto for preventing the motor turning, relatively to the frame, about an axis extending longitudinally of the vehicle.

3. In a motor vehicle, the combination of a motor supporting frame comprising side bars, a motor having laterally extended supporting arms or brackets, means connecting said arms to said side bars whereby the motor is supported thereon, a cross bar adjacent one end of said motor and connected to said frame, and means connecting said motor to said cross bar.

4. In a motor vehicle, the combination of a motor supporting frame comprising side bars, a cross bar connected to said frame, a motor, supporting arms or brackets extending laterally from the motor, means connecting said arms to said frame, and means connecting said motor to said cross bar, one of said means being flexible and permitting relative movement of the motor and adjacent parts of the frame and the other of said means being rigid and tending to limit the extent of said movement.

5. In a motor vehicle, the combination of a motor supporting frame comprising side bars, a motor having laterally extended supporting arms or brackets, means connecting said arms to said side bars whereby the motor is supported thereon, a cross bar adjacent one end of said motor and connected at both ends to said frame, and means connecting said motor to said cross bar at the middle portion of the cross bar.

In testimony whereof I affix my signature in presence of two witnesses.

EDWARD P. COWLES.

Witnesses:
A. B. CHENEY,
H. M. BALLARD.